United States Patent [19]
Reinhart et al.

[11] Patent Number: 5,569,393
[45] Date of Patent: Oct. 29, 1996

[54] METHOD AND APPARATUS FOR SAMPLE AND DEFECT REMOVAL FROM A BORE

[75] Inventors: Eugene R. Reinhart; Michael C. Monaco; Gary T. Salisbury, all of Austin, Tex.

[73] Assignee: Reinhart & Associates, Inc., Austin, Tex.

[21] Appl. No.: 272,697

[22] Filed: Jul. 8, 1994

[51] Int. Cl.⁶ .................. B23H 1/00; B23H 9/00
[52] U.S. Cl. .................. 219/69.15; 219/69.17; 219/69.2
[58] Field of Search ............... 219/69.2, 69.11, 219/69.1, 69.15, 68; 30/103, 104, 105, 106, 107, 108; 82/88, 90; 83/191, 187

[56] References Cited

U.S. PATENT DOCUMENTS

| | | |
|---|---|---|
| 2,263,412 | 11/1941 | Armentrout . |
| 2,902,584 | 9/1959 | Ullmann ............... 219/69.15 |
| 3,966,349 | 6/1976 | Osman et al. . |
| 4,162,383 | 7/1979 | Hamasaki ............... 219/68 |
| 4,243,862 | 1/1981 | Wetzels ............... 219/69.15 |
| 4,743,729 | 5/1988 | Beal ............... 219/69.17 |
| 4,773,799 | 9/1988 | Guironnet ............... 408/150 |
| 4,845,896 | 7/1989 | Mercaldi . |
| 4,856,233 | 8/1989 | Mercaldi . |
| 4,948,933 | 8/1990 | Thompson ............... 219/69.2 |
| 5,225,646 | 7/1993 | Chiang ............... 219/69.11 |
| 5,268,550 | 12/1993 | Blocquel et al. ............... 219/69.2 |
| 5,317,607 | 5/1994 | Formanek ............... 219/69.2 |
| 5,408,883 | 4/1995 | Clark, Jr. et al. ............... 376/260 |

FOREIGN PATENT DOCUMENTS

| | | | |
|---|---|---|---|
| 154228 | 9/1985 | European Pat. Off. ......... 219/69.15 |
| 2652771 | 4/1991 | France ............... 219/69.2 |
| 2687946 | 9/1993 | France . |
| 62-228986 | 10/1987 | Japan . |
| 62-255018 | 11/1987 | Japan . |

*Primary Examiner*—Geoffrey S. Evans
*Attorney, Agent, or Firm*—Russell D. Culbertson; Shaffer & Culbertson

[57] ABSTRACT

A metal section removing tool (10) separates a section of metal from a metal object (M) such as a turbine rotor. The tool (10) separates an elongated section of metal from the object using a pivotally mounted cutting device (16) that cuts along a cutting arc ("B") with cutting arc axis ("A") aligned parallel to the longitudinal axis of the cutting device. Preferably, the tool (10) uses electric discharge machining to separate the metal section from the object (M). The tool (10) also includes channels (48, 50) formed in the cutting device (16) for directing the flow of a dielectric fluid to a cutting edge of the cutting device (16). The cutting method includes first securing a carriage at a fixed position with respect to the object and then pivoting the cutting device along the cutting arc ("B") to separate a section of metal from the object (M).

7 Claims, 5 Drawing Sheets

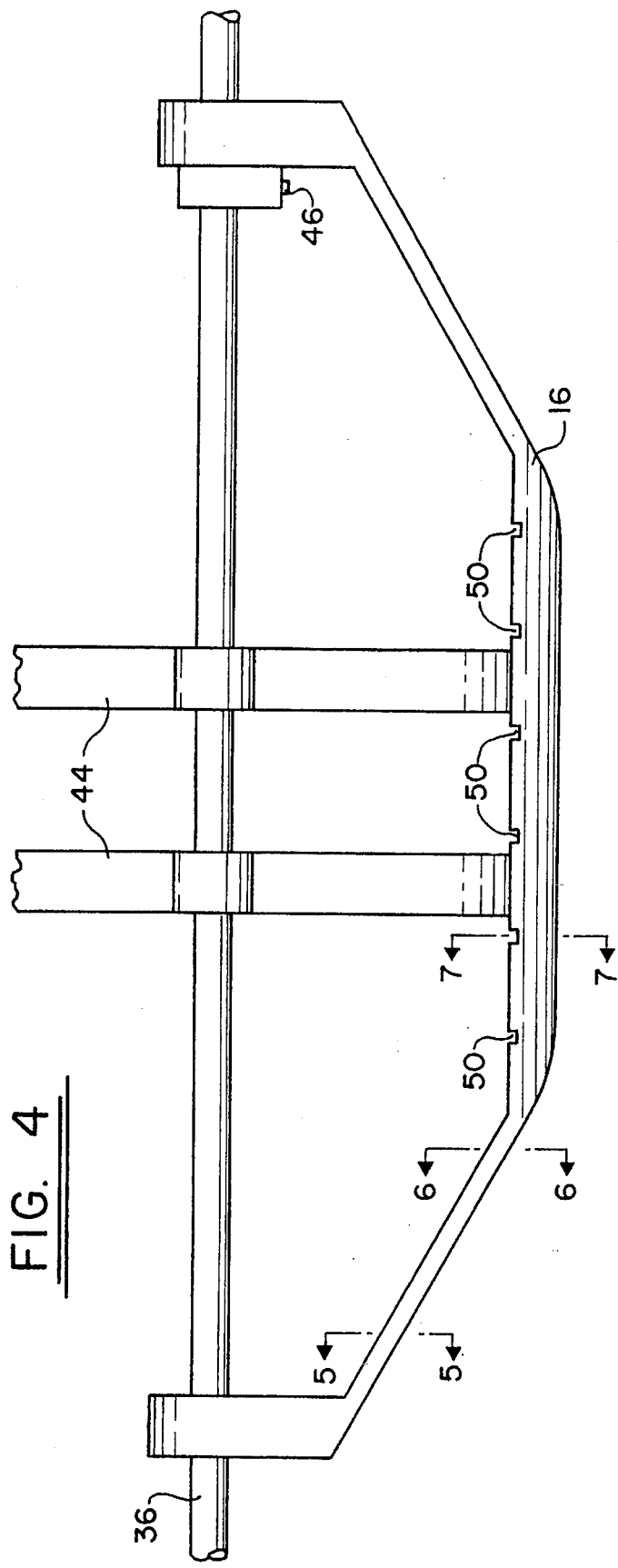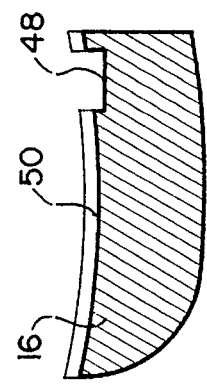

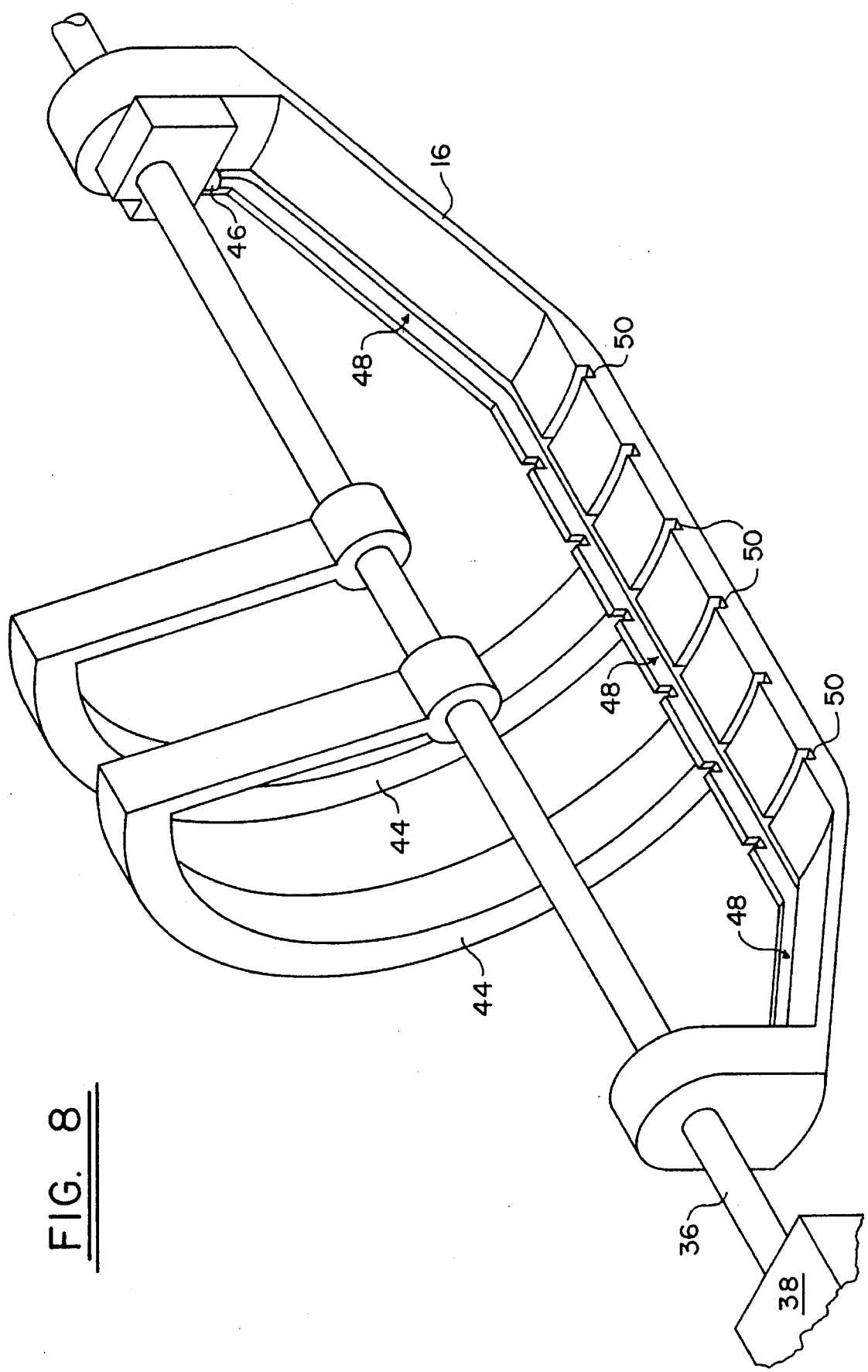

METHOD AND APPARATUS FOR SAMPLE AND DEFECT REMOVAL FROM A BORE

BACKGROUND OF THE INVENTION

This invention relates to material testing and defect removal in metal objects. In particular, this invention relates to an apparatus and method for removing relatively large metal sections from a metal object without producing stress concentrations at the removal site.

Large metal objects, such as turbine rotors for example, often operate in hostile environments. Turbine rotors are subject to large mechanical stresses resulting from their high speed rotation and large variations in operating temperatures. Over time, these stresses may compromise the mechanical integrity of the objects. Turbine rotor failure can be catastrophic, not only financially, but also in terms of the loss of human life. Therefore, preventative maintenance and repair is very important for turbine rotors as well as for numerous other large metal components used in industrial applications.

Technicians use metallurgy and standardized stress testing on metal samples taken from an object to determine the relative condition of the metal comprising the object. To achieve useful results with the tests, however, the samples must be of a minimum size and must be representative of the metal object as a whole. Therefore, the selection of a sampling site and the sampling process itself are both critical. The sample retrieving process must not change the composition or condition of the sample. Additionally, when a sample is removed, the sampling site must be repaired to prevent any stress concentrations from forming at the site.

On a turbine rotor, the highest stresses occur on the surface of a bore that runs along the rotor longitudinal axis. Because the metal at the surface of the bore should be in relatively worse shape than the metal in other parts of the shaft, samples taken from the surface of the bore should represent the worst case condition of the rotor as a whole. However, because access to the rotor bore is usually limited, it is difficult to remove a sample from the bore of sufficient size for standard tests, such as a "Charpy" test for example. The limited access to the bore also makes it difficult to repair any damage caused by the sample removal process.

Beyond testing, it is often desirable to remove material from a metal object for the purpose of removing material defects. When a crack forms on a turbine rotor, for example, the crack must be removed before it expands and threatens the mechanical integrity of the rotor. If the crack forms on the outer surface of the turbine rotor, it may be removed by grinding down and polishing the surface of the rotor. However, since the surface of the turbine rotor bore is subject to large stresses, cracks often form on the surface of the bore. Removing a crack that forms on the inner surface of a turbine rotor is much more difficult and expensive than removing one that forms on the outer surface of the rotor and generally requires expensive milling operations.

Various devices have been developed for removing sections from the surfaces of bores and other surfaces on metal objects. Some of these devices remove sections that are large enough to use with standard tests but the removal process damages the object so badly that major repair work is required to prevent stress concentrations from forming at the sampling site. One device, for example, cuts a v-shaped groove from an inner wall of the object. The v-shaped void remaining in the object, however, must itself be removed from the object to prevent stress concentrations from forming at the apex of the v-shaped void.

U.S. Pat. Nos. 4,845,896 and 4,856,233 to Mercaldi disclosed a device that operated to remove a section of material from the inner surface of a pipe. The Mercaldi device included a hemispherically shaped cutter capable of spinning about an axis parallel to the pipe axis and articulating downwardly while continuing to spin. A cutting edge of the spinning cutter cuts into the inner surface of the pipe taking a small dimple-shaped sample. However, the sections taken by the Mercaldi device were too small to use with standard tests, such as the "Charpy" test. Additionally, this device generally removed only a shallow surface section which was not representative of the object as a whole. Further, because the samples were small, the removal process would probably change the properties of the section so that it was no longer representative of the metal object. Also, the Mercaldi hemispherically shaped cutter left a void that required milling to prevent stress concentrations.

SUMMARY OF THE INVENTION

It is an object of the present invention to overcome the above-described limitations and other limitations of prior metal sampling devices. More particularly, it is an object of the present invention to provide an apparatus and method for removing from a metal object a section of metal that is large enough to use with standard testing procedures. It is a further object to provide an apparatus and method for removing a metal section in a manner that prevents stress concentrations from forming at the location where the section was removed. Another object of the present invention is to provide an apparatus and method for removing defects from the surface of a metal object.

To accomplish these objects, a material section removing tool embodying the principles of the present invention comprises a carriage, securing means, and cutting means. The securing means is mounted on the carriage and functions to secure the carriage at a fixed position with respect to the metal object. The cutting means is also mounted on the carriage and functions to cut a material section from the object.

The cutting means includes preferably an elongated cutter that operates to separate a section of metal of substantial size from the object by any suitable process and preferably electric discharge machining (EDM). The cutter is capable of pivoting with respect to the carriage about a cutting arc axis and along a cutting arc through the metal object to separate the section of metal from the metal object. Also, the cutter is preferably mounted on the carriage such that the cutting arc axis is parallel to a longitudinal axis of the cutting means.

The invention also includes a method of removing a section of material from the surface of a metal object. The method includes securing the carriage to the metal object and pivoting the cutting means to separate a section of metal from the object. Separating the section of metal from the object may employ the EDM process.

The tool embodying the principles of the present invention separates a section of metal that is large enough to use with standard tests and large enough to remove common surface flaws. Because the cut for the section is made deeply, the section is representative of the object as a whole and not just the surface layer. Further, when EDM cutting is employed, only a small portion of the metal section is affected by the cutting procedure, resulting in a metal section that is representative of the surrounding metal.

These and other objects, advantages, and features of the invention will be readily apparent from the following description of the preferred embodiments, considered along with the accompanying drawings.

BRIEF DESCRIPTION OF THE DRAWINGS

FIG. 4 is an isolated diagrammatic side elevational view of the cutter and the cradle.

FIG. 5 is a transverse sectional view of the cutter taken along line 5—5 in FIG. 4.

FIG. 6 is a transverse sectional view of the cutter taken along line 6—6 in FIG. 4.

FIG. 7 is a transverse sectional view of the cutter taken along line 7—7 in FIG. 4.

FIG. 8 is an isolated, mostly diagrammatic isometric view of the cutter and the cradle.

DESCRIPTION OF THE PREFERRED EMBODIMENTS

Figure 1:
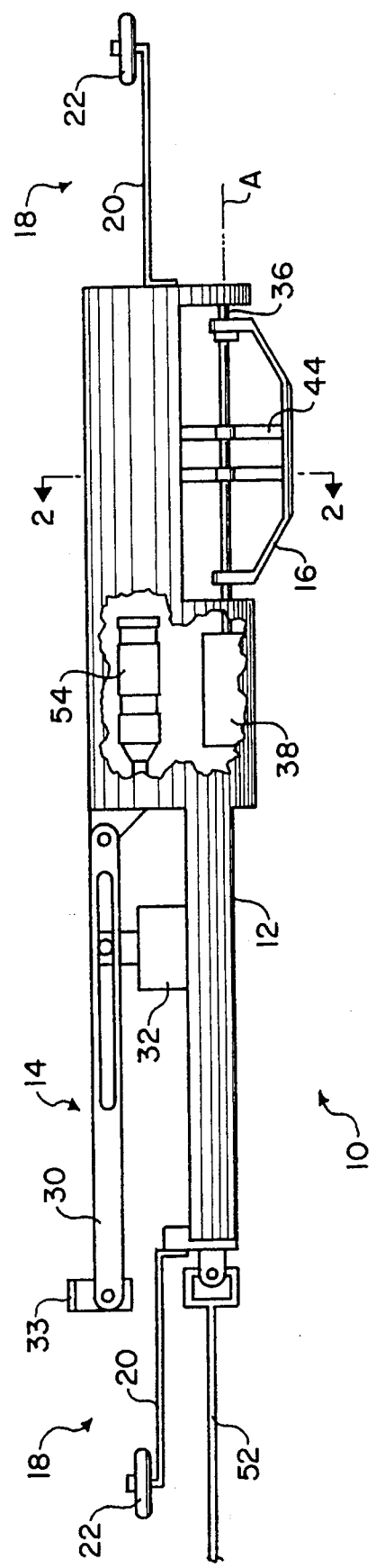
FIG. 1 is a diagrammatic elevational view partially borken away showing a metal section removing tool embodying the principles of the present invention.

FIGS. 1 through 8 illustrate one preferred form of the metal section or sample removing apparatus embodying the principles of the present invention. FIG. 1 shows the entire metal section removing tool 10 comprising a carriage 12, securing means, shown generally at reference numeral 14, and cutting means including a cutter 16.

As shown in FIG. 1, the securing means 14 and the cutter 16 are mounted on the carriage 12. Preferably, the carriage 12 comprises an elongated frame with a small transverse cross-sectional shape that enables the tool 10 to enter small openings such as a bore in a turbine rotor. However, it will be readily apparent to those skilled in the art that the carriage 12 could take other shapes and configurations. Further, the tool 10 according to the invention is not limited to taking samples from turbine rotor bores. An apparatus embodying the principles of the invention could be employed to remove sections of material from the surface of many types of objects.

Included on the carriage 12 are centering structures 18 adapted to center the carriage within a turbine bore or another space. As shown in FIG. 1, a centering structure 18 is preferably located at each end of the carriage 12. As detailed in FIGS. 2 and 3, the centering structures 18 each comprise two arms 20 and a wheel 22 rotatably mounted on the end of each arm. The two arms 20 of the centering structures 18 are formed of a deformable and resilient material. Preferably, as shown particularly in FIG. 3, when the securing means 14 is not engaged, each of the arms 20 extend substantially radially from the carriage 12 to center the carriage in a bore. Typically, the tool 10 will be used to remove a sample from a turbine bore that is cylindrical in shape. Therefore, the centering structures 18 operate to center the carriage 12 as shown in FIG. 3. As shown particularly in FIG. 2, when the securing means 14 engages to secure the carriage 12 within the bore, the centering structures continue to center the carriage 12 in the bore but the arms 20 of the centering structure are forced to bend by the action of the securing means 14. When the securing means 14 retracts, the resilient arms 20 force the carriage 12 again into the position shown in FIG. 2.

The, securing means 14 operates to secure the carriage 12 at a fixed position with respect to a metal object M. Referring particularly to FIG. 1, the securing means 14 is mounted on the carriage 12 and preferably comprises an elongated securing arm 30 pivotally mounted on the carriage 12 and connected to a controlling piston 32, also mounted on the carriage 12. The controlling piston or actuator 32 is capable of extending the securing arm 30 such that a contacting pad 33 on the arm contacts a surface above the carriage 12. Extending the securing arm 30 in this manner forces the carriage 12 downwardly against the metal object M to a position shown in FIG. 2 and holds the carriage in a fixed location relative to the metal object M. Although the securing means 14 shown in the Figures is preferred for use when working in pipes or rotor bores, those skilled in the art will readily appreciate that various other mechanisms may be employed to secure the carriage 12 at a fixed position with respect to a metal object from which a section of material is to be removed.

Figure 2:
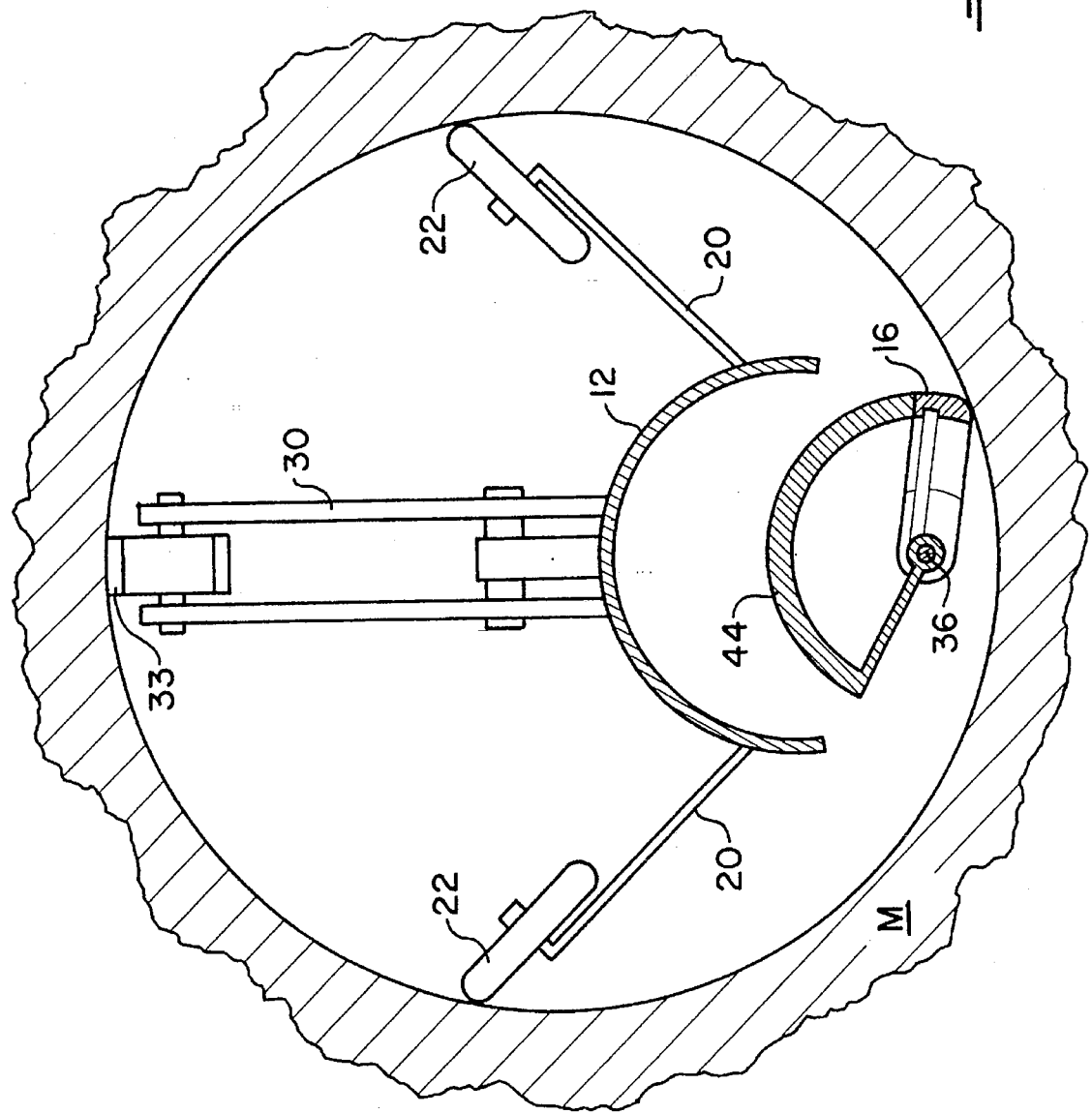
FIG. 2 is a transverse sectional view taken along line 2—2 of FIG. 1 with the cutter pivoted to a position prior to removing a sample and the tool secured with respect to a metal object.
Figure 3:
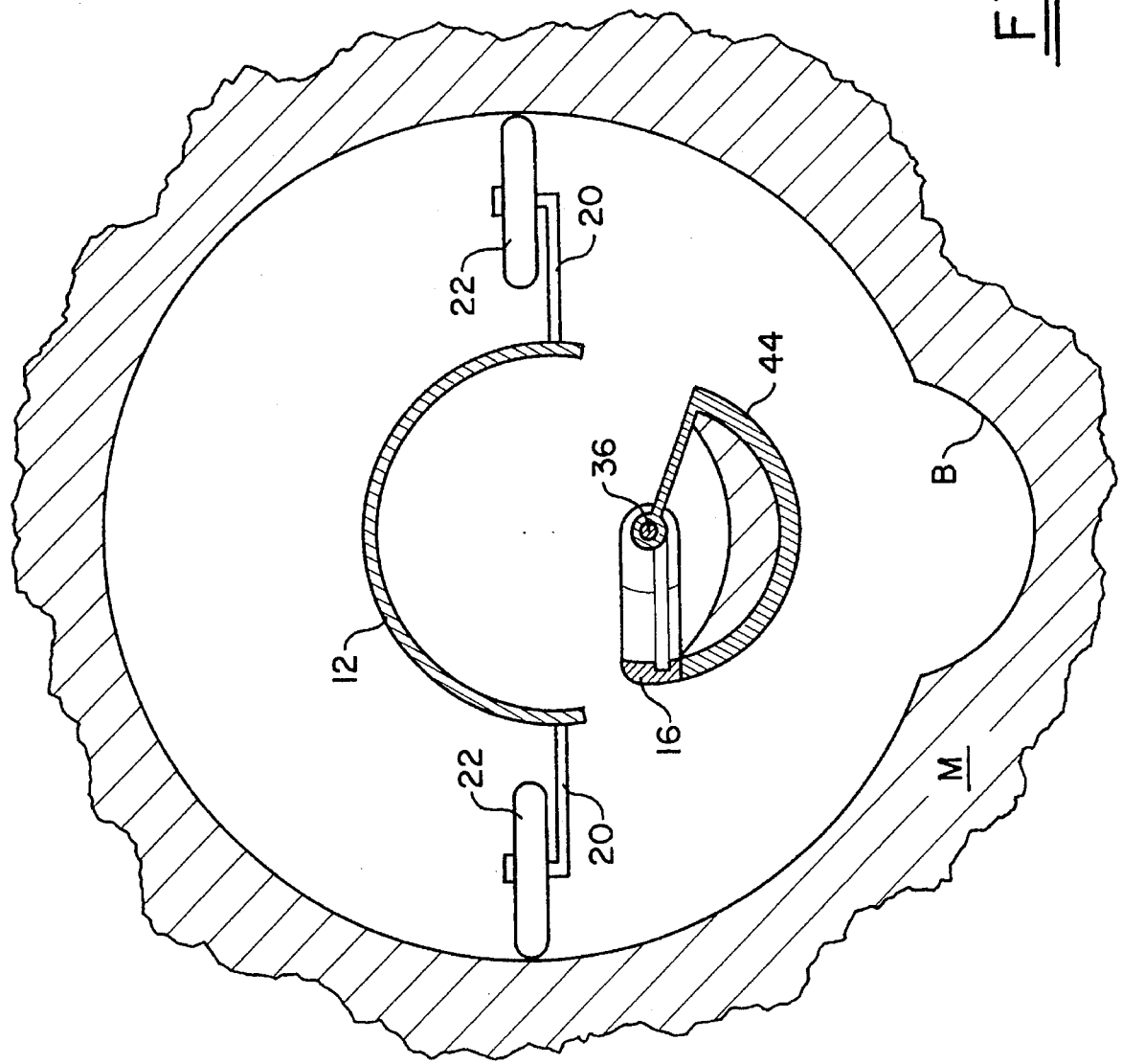
FIG. 3 is a transverse sectional view taken along line 2—2 of FIG. 1 but with the cutter pivoted to capture a removed metal sample after the removal of the sample and with the tool unsecured with respect to the metal object.

Referring now to FIGS. 1, 2, 3, and 8, the cutting means including the cutter 16 operates to separate a section of metal from the metal object. Preferably, the cutting means employs electric discharge machining (EDM) to separate the metal section from the object although other cutting methods could be employed. The cutter 16 is pivotally mounted on the carriage 12 such that it is capable of pivoting about a cutting arc axis "A" and along a cutting arc "B" as best shown in FIGS. 2 and 3. Preferably the cutter 16 is elongated and is mounted on the carriage 12 such that its longitudinal axis is parallel to the cutting arc axis "A".

Referring still to FIGS. 1, 2, 3, and 8, the cutter 16, preferably comprising an EDM tool, is mounted on a rotatable shaft 36 that is driven by a gear head stepper motor 38. When EDM is used to produce the desired cutting action, the cutter 16 preferably is constructed of a high-density graphite but could be constructed of any suitable high-density material with good electrical conducting properties. Further, the electrode portion of the cutter 16 is curved to match the radius of the cut in order to confine wear to the tool's leading edge. A cradle 44 is preferably connected to the cutter 16 and extends about the cutting arc axis "A" so that as the cutter 16 rotates the cradle 44 follows the cutting arc "B". The cradle 44 is made of a suitable electrical non-conducive material so that it does not conduct electricity but so that it has sufficient strength to lift a metal sample once the cutter 16 separates the sample from the metal structure M.

As shown in FIGS. 1, 6, and 8, the cutter 16 is shaped to leave a trough shaped cutout with a 30 degree slope at the ends and bottom of the trough with respect to surface of the metal object M from which a sample is removed. This shape allows easy access to the trough for post sampling removal of the heat affected zones by a grinding tool (not shown). Further, stress concentrations caused by the 30 degree taper are comparatively small.

With specific reference to FIG. 2 first and FIG. 3 second, the tool 16 rotates clockwise on the shaft 36 which aligns with the cutting arc axis "A" to pass through the cutting arc "B" and separate a section of metal (FIG. 3) from the metal object M. The cradle 44 operates to catch the section of metal after it is completely separated from the metal object M by the cutter 16. The cutter 16 is slightly thicker than the cradle 44 so that the cradle material may easily pass through the cut made by the cutter even after the cutter wears down in use.

During an EDM cutting process, the cutter 16 must be submerged in a dielectric fluid to prevent inadvertent discharge, to remove debris created by the cutting process, and to allow precise control of the cutting process. Preferably, the tool 10 is at least partially submerged in dielectric fluid by partially flooding the volume in which the tool 10 operates. For example, when the tool serves to remove a sample from the bore of a turbine, as shown in FIGS. 2 and 3, the end openings (not shown) of the bore are plugged and a dielectric fluid is circulated through the bore. Because EDM cutting is confirmed to the lower surface of the bore, only a portion of the bore must be flooded with dielectric fluid. Preferably, the dielectric fluid is pumped into the bore from a first end, circulated through the bore, removed from a second end of the bore, and filtered so that it may be reused.

To obtain optimum cutting results, the dielectric fluid must be directed to the location where the cutter 16 meets the metal object M. Therefore, as shown in FIGS. 4 through 8, the tool 10 preferably includes a nozzle 46 that directs dielectric fluid to the cutter 16. Further included is an axial channel 48 formed in the cutter 16 that guides the dielectric fluid to circumferential channels 50 formed in the cutter. The circumferential channels 50 then direct the dielectric fluid to the location where the cutter 16 meets the metal structure M. In this manner, sufficient circulation of dielectric fluid is provided to ensure a constant dielectric flush during the cut, such flushing being essential to the EDM cutting process.

Although not shown in the Figures, for the sake of simplifying the description of the invention, controlling and powering equipment along with associated connecting equipment is included in the preferred form of the tool 10. Preferably, the controlling piston or actuator 32 is pneumatically controlled from a remote location although other means of control may be used. Electrical cables supply power to the stepper motor 38 and the EDM cutter 16. Dielectric fluid is circulated within the bore by a suitable pump via suitable hoses and a filtering system filters the dielectric fluid for reuse. Further, the tool 10 preferably includes a semi-rigid cable 52 attached to an end of the tool for moving the tool through a turbine bore or similar access-restricted area. However, one skilled in the art will readily appreciate that other means, such as motor driven tracks or wheels, could also be used for moving the tool 10 in a access-restricted area. As shown in FIG. 1, the tool 10 also preferably includes a video camera 54 for viewing the sample removing process. The camera 54 is protected by a suitable housing.

The operation of the tool 10 and the method of the invention may now be described with reference to FIGS. 1–3. The method includes first securing the carriage 12 in a fixed position with respect to the metal object M. With specific reference to FIG. 2, the carriage 12 is secured in a turbine bore, for example, by extending the elongated arm 30 of a securing means 14 so that a contacting pad 33 pushes against a surface of the bore. The extended arm 30 forces the carriage 12 against an opposite, bottom side of the bore to secure the tool 10 in place.

Once the carriage is secured, the method includes pivoting the cutter 16 about a cutting arc axis "A" (FIG. 2) that is parallel to a longitudinal axis of the cutter 16 so that the cutter travels along a cutting arc (B) through the object M and separates the metal section from the object. Preferably this step employs EDM to cut through the material of the object M, although other techniques could be employed.

Referring now to FIG. 2, the step of pivoting the cutter 16 includes first flooding the area to be cut with dielectric fluid and then applying an EDM voltage to the cutter 16. The stepper motor 38 then operates to cause the shaft 36 to slowly rotate and move the cutter 16 along the cutting arc "B". As the cutter 16 approaches the surface of the metal object M, the dielectric fluid prevents premature discharge from the cutting edge to the object. Only when the cutter 16 is close enough to the surface of the object to break down the dielectric strength of the fluid does the cutter discharge to the surface of the object. The discharge erodes a small portion of the object and the eroded material is carried away by the dielectric fluid.

Typically, the EDM cutting means pulses at a voltage and frequency selected to obtain a desired cutting speed and a desired smoothness of cut. Selecting a smooth cut minimizes the need for post-removal repair. An advantage of using EDM over other cutting techniques is that cutting speed is independent of the hardness of the material of the object and, because the cutter 16 does not contact the surface of the metal object, minimal torque is required to rotate the EDM cutter 16 on the shaft 36.

Referring now to FIG. 3, the EDM cutter 16 continues to rotate until it separates the section of metal from the metal object M. Once the section is separated, the cradle 44 catches the section and holds the section for removal with the tool 10. Because the cradle 44 is constructed of a dielectric material, it is not energized and does not cause the metal section to erode as the cradle passes along the cutting arc. Preferably, the method of the present invention also includes the step of directing dielectric fluid to locations where the cutter 16 contacts the metal object M. Dielectric fluid is pumped into the bore and then directed by a nozzle 46 mounted on the tool 10 which directs dielectric fluid to channels 48 and 50 formed in the cutter 16. These channels 48 and 50 direct the dielectric fluid to a cutting location so that debris created by the cutting process may be efficiently removed by the dielectric fluid.

The above described preferred embodiment is intended to illustrate the principles of the invention, but not to limit the scope of the invention. Various other embodiments and modifications to this preferred embodiment may be made by those skilled in the art without departing from the scope of the following claims.

We claim:

1. An apparatus for removing a section of material from the surface of an elongated bore extending through a metal object, the apparatus comprising:

(a) an elongated carriage adapted to be inserted longitudinally through the bore;

(b) securing means connected to the carriage for securing the carriage at a desired longitudinal position within the bore;

(c) a shaft mounted on the carriage and extending substantially parallel to a longitudinal axis of the carriage, the shaft being rotatable with respect to the carriage along a shaft longitudinal axis;

(d) drive means associated with the shaft for rotating the shaft about the shaft longitudinal axis; and (e) an elongated cutting element for separating an elongated section of material from the object, the elongated cutting element including a central section extending substantially parallel to the shaft and two end sections each extending from a different end of the central section toward the shaft, the cutting element also being connected by its end sections to the shaft in position to pivot about a cutting arc axis corresponding to the shaft longitudinal axis so that the cutting element travels along a cutting arc through the object to separate a section of material therefrom, the cutting arc intersecting the bore surface in two spaced apart locations.

2. The apparatus of claim 1 wherein the cutting element comprises an electric discharge machining element.

3. The apparatus of claim 1 wherein the elongated cutting element includes a curved transition section between the central section and each end section and wherein the end sections each extend at an acute angle with respect to the longitudinal axis of the cutting element central section.

4. The apparatus of claim 1 further comprising a cradle connected to the cutting element for capturing the section of material after it is separated from the object.

5. The apparatus of claim 1 further comprising:

(a) a longitudinal channel extending substantially the length of the elongated cutting element along an inner surface thereof; and (b) a plurality of transverse channels extending perpendicular to and intersecting the longitudinal channel, the longitudinal and transverse channels for directing dielectric fluid to a cutting edge of the cutting element.

6. A method of using electric discharge machining to remove a section of material from the surface of a bore extending through a metal object, the method comprising the steps of:

(a) securing a carriage in a desired longitudinal position within the bore, the carriage having mounted thereon an elongated electric discharge machining cutting element having its longitudinal axis extending substantially parallel to the longitudinal axis of the bore; and (b) pivoting the cutting element about a cutting arc axis that is substantially parallel to the longitudinal axis of the bore, the elongated cutting element including a central section extending parallel to the cutting arc axis and end sections extending toward the cutting arc axis at an acute angle with respect to the longitudinal axis of the central section, the pivoting of the elongated cutting element about the cutting arc axis causing the cutting element to travel along an arc which intersects the bore surface at two spaced apart locations thereby separating the material section within the arc from the object.

7. The method of claim 6 further comprising the step of:

(a) directing dielectric fluid to a cutting edge of the electric discharge machining cutting element through a longitudinal channel formed along the length of the cutting element at an inner surface thereof and through a plurality of transverse channels spaced apart along the length of the cutting element, each transverse channel intersecting the longitudinal channel and extending substantially perpendicular to the cutting element longitudinal axis.

* * * * *